United States Patent
Milton et al.

(10) Patent No.: US 10,679,231 B2
(45) Date of Patent: Jun. 9, 2020

(54) MEASURING RETAIL VISITATION AMOUNTS BASED ON LOCATIONS SENSED BY MOBILE DEVICES

(71) Applicant: PlaceIQ, Inc., New York, NY (US)

(72) Inventors: Stephen Milton, Lyons, CO (US); Duncan McCall, Greenwhich, CT (US)

(73) Assignee: PlaceIQ, Inc., New York, NY (US)

( * ) Notice: Subject to any disclaimer, the term of this patent is extended or adjusted under 35 U.S.C. 154(b) by 106 days.

(21) Appl. No.: 16/120,250

(22) Filed: Sep. 1, 2018

(65) Prior Publication Data

US 2019/0130426 A1    May 2, 2019

Related U.S. Application Data

(63) Continuation of application No. 14/311,264, filed on Jun. 21, 2014, now abandoned, which is a continuation of application No. 13/769,736, filed on Feb. 18, 2013, now abandoned.

(51) Int. Cl.
    *G06Q 30/02* (2012.01)

(52) U.S. Cl.
    CPC ..... *G06Q 30/0205* (2013.01); *G06Q 30/0201* (2013.01); *G06Q 30/0242* (2013.01)

(58) Field of Classification Search
    None
    See application file for complete search history.

(56) References Cited

U.S. PATENT DOCUMENTS

| | | | | |
|---|---|---|---|---|
| 6,332,127 B1 * | 12/2001 | Bandera | ............... | G06Q 30/02 705/14.55 |
| 2006/0085177 A1 * | 4/2006 | Toyama | ............... | G01C 21/26 703/22 |
| 2007/0005419 A1 * | 1/2007 | Horvitz | ............... | G06Q 30/02 701/533 |
| 2007/0115142 A1 * | 5/2007 | Nakashima | ........ | G01C 21/3682 340/995.1 |
| 2007/0185768 A1 * | 8/2007 | Vengroff | ............... | G06Q 30/04 705/14.64 |
| 2008/0086264 A1 | 4/2008 | Fisher | | |
| 2008/0133342 A1 | 6/2008 | Criou et al. | | |

(Continued)

OTHER PUBLICATIONS

For every AT&T Android user there are 15 iPhone users_ What will be the ratio at Verizon Asymco, Jan. 11, 2011 http://www.asymco.com/2011/01/11/for-every-att-android-user-there-are-15-iPhone-users-what-wil-be-the-ratio-at-verizon/.

(Continued)

*Primary Examiner* — Octavian Rotaru
(74) *Attorney, Agent, or Firm* — Pillsbury Winthrop Shaw Pittman, LLP

(57) ABSTRACT

Provided is a computer-implemented method that includes obtaining a user location dataset indicative of a location visited by a user, the user location dataset being based at least in part on a location signal received from a mobile computing device associated with the user, determining that the location visited corresponds to a geographic location of a place of interest, determining, using a computer, a visit count corresponding to the location dataset, adjusting a visit count for the place of interest to include the visit count corresponding to the location dataset, and storing the adjusted visit count for the place of interest in a visitation rate datastore.

28 Claims, 4 Drawing Sheets

(56) References Cited

U.S. PATENT DOCUMENTS

| | | | | |
|---|---|---|---|---|
| 2008/0248815 | A1* | 10/2008 | Busch | G06Q 30/0233 455/456.5 |
| 2008/0288165 | A1* | 11/2008 | Suomela | G01C 21/3641 701/533 |
| 2009/0070230 | A1* | 3/2009 | Silverstein | G06Q 20/04 705/26.1 |
| 2009/0112467 | A1* | 4/2009 | Jiang | G01C 21/20 701/431 |
| 2009/0132366 | A1* | 5/2009 | Lam | G06Q 30/02 705/14.36 |
| 2009/0138427 | A1* | 5/2009 | Kalavade | G06Q 10/0637 |
| 2009/0319187 | A1* | 12/2009 | Deeming | G06Q 30/02 701/300 |
| 2010/0079336 | A1* | 4/2010 | Skibiski | G06Q 30/02 342/357.31 |
| 2010/0153216 | A1* | 6/2010 | Liang | G06Q 30/0259 705/14.57 |
| 2010/0205060 | A1* | 8/2010 | Athsani | G01C 21/3484 705/14.58 |
| 2010/0285818 | A1* | 11/2010 | Crawford | H04W 4/21 455/456.3 |
| 2010/0317371 | A1* | 12/2010 | Westerinen | H04M 1/72566 455/456.6 |
| 2010/0324994 | A1* | 12/2010 | Crawford | H04W 4/21 705/14.58 |
| 2011/0010422 | A1 | 1/2011 | Bezancon et al. | |
| 2011/0093340 | A1* | 4/2011 | Kramer | G06Q 30/02 705/14.58 |
| 2011/0143779 | A1* | 6/2011 | Rowe | H04W 4/02 455/456.3 |
| 2011/0173055 | A1* | 7/2011 | Ross | G06Q 30/02 705/14.13 |
| 2011/0173072 | A1* | 7/2011 | Ross | G06Q 30/02 705/14.57 |
| 2011/0191140 | A1 | 8/2011 | Newman | |
| 2012/0030011 | A1* | 2/2012 | Rey | G06Q 30/0242 705/14.43 |
| 2012/0115475 | A1* | 5/2012 | Miyake | G06Q 10/06 455/435.1 |
| 2012/0238248 | A1* | 9/2012 | Jonsson | G06Q 10/1095 455/413 |
| 2012/0290383 | A1* | 11/2012 | Busch | G06Q 30/02 705/14.36 |
| 2012/0310737 | A1* | 12/2012 | Song | G06Q 30/0261 705/14.57 |
| 2013/0046613 | A1 | 2/2013 | Farahat et al. | |
| 2013/0054335 | A1* | 2/2013 | Kjelsbak | G06F 3/04883 705/14.26 |
| 2014/0278655 | A1* | 9/2014 | Sorensen | G06Q 10/063118 705/7.17 |

OTHER PUBLICATIONS

PlaceIQ product, placeiq webpages, retrieved from archives.org, Feb. 7-10, 2012.

Place IQ How location time of day and weather and our mood add context to what and where we buy, youtbue video extract, Feb. 2, 2012, https://www.youtube.com/watch?v=PJmx6m_gUwB.

Schonfel Erick, Study Mobile Ad-Tracking Systems are blind to 80 percent of Apple iOS Devices, techcrunch webpages, Mar. 15, 2011, http:techcrunch.com/2011/03/15mobile-ad-blind-80-percent-apple-ios/.

http://web.archive.org/web/20120207112155/http:/www.placeiq.com/product/.

McCall Duncan, CEO and Co-founder, PlaceIQ the wong to do location-based ads, youtube, Jan. 6, 2012, http:www.youtube.com/watch?v=p_QcS5w6lco.

McCall Duncan, PlaceIQ, IAB Interactive Advertising Bureau, Jun. 17, 2011 https:www.youtube.com/watch?v=nOMdm11etCQ.

Kazemi et al., A privacy-aware framework for participatory sensing, ACM SIGKDD Explorations Newsletter, V 13, I1, pp. 43-51, Jun. 2011.

Hoozeware, youtube webpages Aug. 17, 2011 http:www.youtube.com/watch?v=DascHOSvSAc.

Blyukher, Lenny, "How "Big Data" enables JiWire to deliver 30% or more lift in campaign performance," Aug. 16, 2012.

Analysis of a Location-based Social Network; Nan Li; Guanling Chen; CSE '09 Proceedings of the 2009 International Conference on Computational Science and Engineering—vol. 04; pp. 263-270.

Identification via location-profiling GSM networks; Mulder et al.; In Proceedings of the 7th ACM workshop on Privacy in the electronic society (2008), pp. 23-32.

Your Apps Are Watching You; Scott Thurm and Yukari Iwatani Kane; Online Wall Street Journal; Dec. 17, 2010.

Designing geolocation services for next generation mobile phone systems; David Mountain and Jonathan Raper; the agi conference at GIS 2000 Workshop 2; Technology Updates.

What Display Advertising Can Learn From Politicians; Moore, James; www.marketingland.com; May 29, 2012.

PlaceIQ's Location-Aware Advertising Can Target You Block by Block; Schonfeld, Erick; techcrunch.com/2011/04/25/placeiq-location-aware-advertising/;Apr. 25, 2011.

Schonfeld Erick, Study Mobile Ad-Tracking Systems are blind to 80 percent of Apple IOS Devices, techcrunch webpages, Mar. 15, 2011 http://techcrunch.com/2011/03/15/mobile-ad-blind-80-percent-apple-ios/.

Aalto et al, Bluetooth WAP Push Based Location-Aware Mobile Advertising System, ACM 1581137931040006, ACM, 2004 http://delivery.acm.org/10.1145/1000000/990073/p49-aalto.pdf?ip=151.207.250.21&acc=ACTIVE%20SERVICE&key=986B26D8D17D60C8AAC6AC1B60173C4E&CFI0=209986779.

Hristova et al, Ad-me Wireless Advertising Adapted to the User Location, Device and Emotions, siteseerx, 2004 http://citeseerx.ist.psu.edu/viewdoc/summary?doi=10.1.1.129.2870.

Ojala et al, SmartRotuaari-Context-aware Mobile Multimedia Services, ACM 15811382610212, 2003 http://www.mediateam.ou lu.fi/publications/pdf/474.pdf.

Rashid et al, Providing location based advertising for existing mobile phone users, DOI 101007, Springer, Nov. 2006 http://link.springer.com/content/pdf/10.1007%2Fs00779-006-0121-4.pdf.

PlaceIQ How location time of day and weather and our mood add context to what and where we buy, youtube video extract, Feb. 2, 2012 https://www.youtube.com/watch?v=PJmx6m_gUw8.

* cited by examiner

MEASURING RETAIL VISITATION AMOUNTS BASED ON LOCATIONS SENSED BY MOBILE DEVICES

CROSS-REFERENCE TO RELATED APPLICATIONS

The present application is a continuation of U.S. patent application Ser. No. 14/311,264 filed Jun. 21, 2014, which is a continuation of U.S. patent application Ser. No. 13/769,736, filed Feb. 18, 2013. The entire contents of each aforelisted patent filing are hereby fully incorporated herein by reference for all purposes.

BACKGROUND OF THE INVENTION

1. Field of the Invention

The present invention relates generally to visitation of places and, more specifically, to identifying visitation rates for places based on location information.

2. Description of the Related Art

User profiles are useful in a variety of contexts. For instance, advertisers often employ user profiles to select when, where, or how they provide advertising messages to consumers. Similarly, market researchers may analyze attributes of consumers to better understand a market for a given good or service. In the context of certain places, such as brick-and-mortar business locations, it is also useful to know who is visiting your location and when. This type of visitation information can be useful in determining the effectiveness of advertising campaigns and, thus, can be used as an additional tool to determine when, where, or how to provide advertising messages to consumers. In some instances, the visitation information assist in managing a business. For example, a retail business may staff a greater number of employees at times when the business is expected to have a relatively high number of visitors.

Unfortunately, user profiles and visitation information can be difficult to obtain. For example, users typically do not report their visits to a location in any reliable manner. In some instances, the number of persons that visit a location can be counted, but such a task can be tedious and may not provide much, if any, information about the demographics of the visitors or what motivated them to visit the location.

SUMMARY OF THE INVENTION

The following is a non-exhaustive listing of some aspects of the present techniques. These and other aspects are described in the following disclosure.

In some embodiments, provided is a computer-implemented method that includes obtaining a user location dataset indicative of a location visited by a user, the user location dataset being based at least in part on a location signal received from a mobile computing device associated with the user, determining that the location visited corresponds to a geographic location of a place of interest, determining, using a computer, a visit count corresponding to the location dataset, adjusting a visit count for the place of interest to include the visit count corresponding to the location dataset, and storing the adjusted visit count for the place of interest in a visitation rate datastore.

In some embodiments, provided is a non-transitory computer readable storage medium comprising program instructions stored thereon that are executable by a processor to perform the following steps: obtaining a user location dataset indicative of a location visited by a user, the user location dataset being based at least in part on a location signal received from a mobile computing device associated with the user, determining that the location visited corresponds to a geographic location of a place of interest, determining, using a computer, a visit count corresponding to the location dataset, adjusting a visit count for the place of interest to include the visit count corresponding to the location dataset, and storing the adjusted visit count for the place of interest in a visitation rate datastore.

In some embodiments, provided is system that includes one or more processors and memory storing instructions that are executable by the one or more processors to perform the following steps: obtaining a user location dataset indicative of a location visited by a user, the user location dataset being based at least in part on a location signal received from a mobile computing device associated with the user, determining that the location visited corresponds to a geographic location of a place of interest, determining, using a computer, a visit count corresponding to the location dataset, adjusting a visit count for the place of interest to include the visit count corresponding to the location dataset, and storing the adjusted visit count for the place of interest in a visitation rate datastore.

Figure 1:
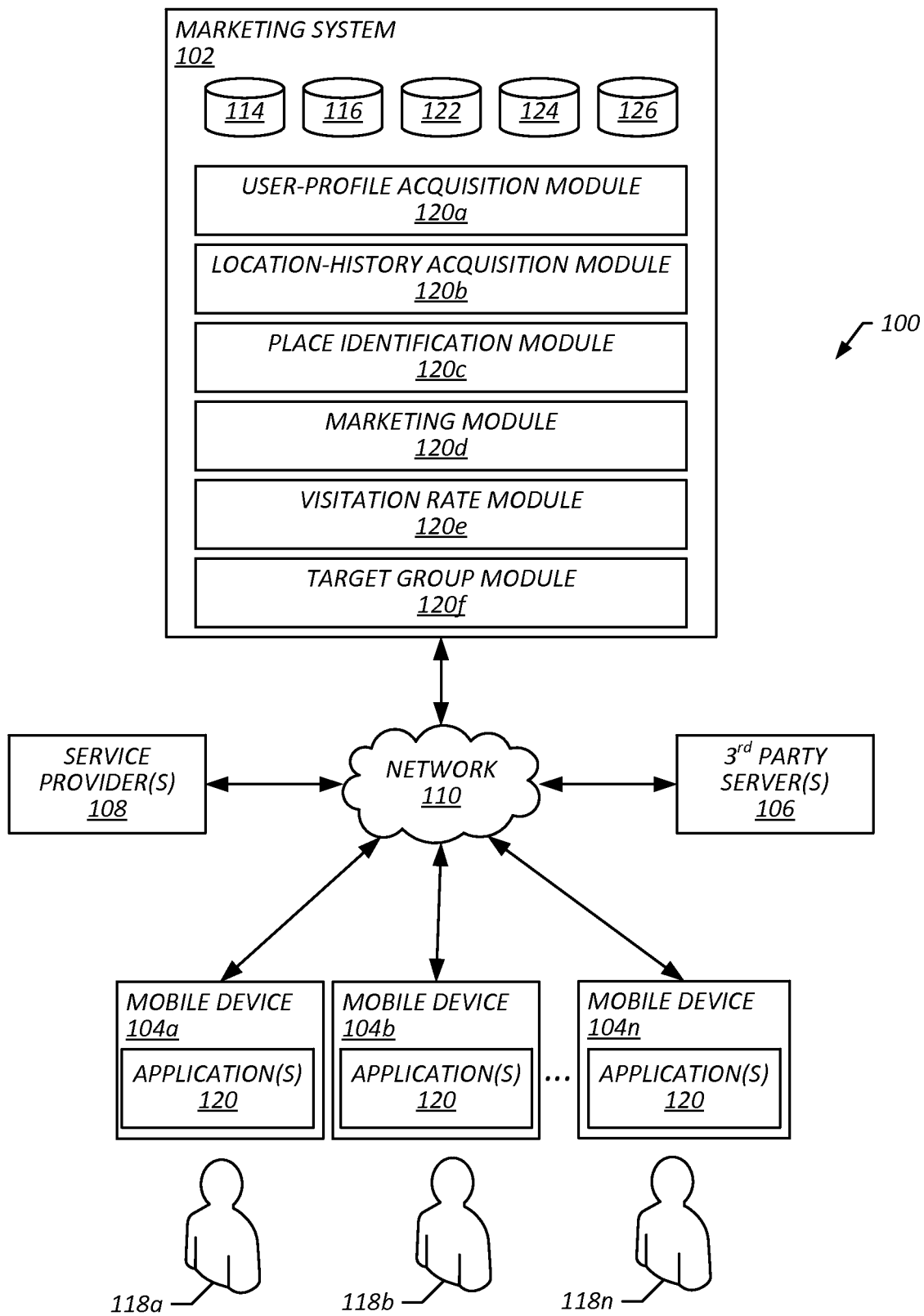
FIG. 1 is a block diagram that illustrates a marketing environment in accordance with one or more embodiments of the present technique.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

As discussed in more detail below, provided are systems and methods for determining visitation rates for various places, referred to herein as "Place Visitation Rates" or "PVRs". A PVR for a given place may reflect a number of persons that have physically visited the place over a relevant period of time. For example, a PVR for a retail store may reflect the number of persons that physically entered the store over a given hour, day, week, month, year, or the like. In some embodiments a PVR may be indicative of a rate at which persons from a given location (e.g., within a particular radius or geographic cell) visit a place. For example, a PVR for a location may indicate that 10% of people served an advertisement for a store while in a given geographic area visit the store within a relevant period (e.g., within one hour of receiving the advertisement).

In some embodiments, determination of PVRs may be a portion of a larger marketing effort. For example, an overall marketing campaign may include identifying user profiles, identifying places of interest, providing marketing content (e.g., advertisements) related to the places of interest, determining PVRs for the places of interest, identify target groups of people based at least in part on the PVRs, and providing targeted marketing content (e.g., targeted advertisements) to the identified groups of people.

In some instances, user profiles can be used to improve estimations numbers of visitors and, thus, improve the quality of the determined PVR. For example, where a PVR for a store is based on a number of users that open mobile applications from their mobile devices (e.g., mobile phones) while located in or near the store, and a mobile device is associated with a user profile, attributes of the user profile can be used to estimate how many other users may also be visiting the store. Moreover, in some embodiments, user profiles can be used to determine demographics of visitors and, in some instances, determine whether or not visits are in response to prior marketing, such as advertisements previously served to visitors' mobile devices.

Although certain embodiments are described herein with regard to certain types of places (e.g., retail stores having brick-and-mortar locations) for the purposes of illustration, similar embodiments can be employed for any variety of places. For example, PVRs can be determined for airports, train and bus stations, sports stadiums, landmarks, parks or other places for which visitation information is desirable.

FIG. 1 is a block diagram that illustrates a marketing environment 100 in accordance with one or more embodiments of the present technique. As depicted, marketing environment 100 includes a marketing system ("system") 102, mobile devices 104 (e.g., mobile devices 104a-104n), third party server(s) (e.g., advertisement servers, website servers, and/or the like) 106, service provider(s) (e.g., cellular service providers, network providers, and/or the like) 108, communicatively coupled via a network 110. Network 110 may include an electronic communications network, such as the Internet, a local area network (LAN), a wide area (WAN), a cellular communications network and/or the like. Network 110 may include a single network or combination of networks.

In some embodiments, marketing system 100 is operative to determine place visitation rates (PVRs) that are stored in a PVR datastore 114. In some embodiments, the PVRs are based on user location histories and user profiles. As discussed herein, in some embodiments, the PVRs and user profiles can be used to determine demographics of visitors and, can also be used to select and serve targeted advertisements or similar marketing content.

In some embodiments, user profiles are stored in a user-profile datastore 116. User profiles may include characteristics about users. For example, a user profile for a user 118a may include a listing of his/her preferences, interests, hobbies, demographics information (e.g., gender, age, etc.), and/or the like. In some embodiments, user profiles include information about mobile devices associated with users. For example, a user profile for user 118a (who has a user account associated with mobile device 104a or otherwise uses mobile device 104a) may specify a device ID for device 104a (e.g., a device ID of "1234"), a type of mobile device 104a (e.g., an Apple iPhone), an operating system employed by mobile device 104a (e.g., iOS 6.0), applications 120 employed by mobile device 104a (e.g., Safari Internet Browser, XYZ App, Mapping App, Search App, etc.), and so forth. In some embodiments, a user profile may include a record of marketing content that has been provided to the user. For example, where an advertisement for the XYZ store has been previously served to mobile device 104a, the user profile for user 118a may be updated to include a record of the advertisement having been provided to user 118a. In some embodiments, the record may include a location and/or time corresponding to a location of mobile device 104a when the advertisement was presented to user 118a (e.g., served to mobile device 114a and/or displayed for viewing on device 114a). As discussed herein, such historical marketing information may be employed to determine PVRs that are indicative of whether marketing content is successful in driving users to visit places.

In some instances, user profile information is acquired directly from users. For example, a user may opt-in to provide their user profile information and directly submit their user profile information via an account information webpage. In some instances, user profile information is acquired indirectly via profiling. For example, a user may opt-in to providing user information, such as their Internet browsing history to a third party (e.g., a website or other service provider). A third party may use the information to determine various profile characteristics about the person, such as their preferences, interests, hobbies, demographic information, and the like.

In some instances, users are provided an opportunity to opt-in or out of collection and sharing of their user profile information. For example, a user may select an option to withhold their user profile information, to share their user profile information without disclosing information by which they can be uniquely identified (e.g., a user ID), or to share their user profile information along with information by which they can be uniquely identified. Thus, user profiles can be maintained in a privacy-friendly fashion.

In some embodiments, location histories are stored in a location datastore 122. Location histories may include records of any number of places visited by any number of users. A location history for a particular user may include, for example, information about one or more places visited by the user. In some embodiments, location histories are based on detected locations of users' mobile devices. For example, where user 118a travels from location A, to location B to location C while carrying his/her mobile device 104a (e.g., having a device ID of 1234), and location datasets are generated that are indicative of mobile device 104a being located in each of locations A, B and C, a location history for mobile device 104a and/or user 118a may include individual location datasets corresponding to each of locations A, B and C. Locations may be expressed in a variety of formats with varying degrees of specificity. For example locations A, B and C may each represent a point (e.g., geographic coordinates—latitude and longitude coordinates) or a geographic area (e.g., geographic tiles/cells of a grid with which a geographic area is segmented, or a polygon representing a physical boundaries associated with a place). As discussed herein, the location datasets can be provided by a mobile device and/or third party entities, such as $3^{rd}$ party servers 106 or service providers 108.

In some embodiments, a location dataset may include an indication of a geographic location along with other contextual information. For example where known, a location dataset may include a geographic location, a time a mobile device was located at the location, how the location was obtained (e.g., via GPS, an application, a website, a device ping, etc.), a confidence score, a device ID (e.g., "1234"), a type of mobile device, an operating system employed by the mobile device, applications 120 employed by mobile device 104a (e.g., Safari Internet Browser, XYZ App, Mapping App, Search App, etc.). A confidence score may be indicative of the accuracy of the detected location. In some embodiments, a confidence score may be based on the technique used to determine the location. For example, a location acquired from a GPS enabled phone may have a relatively high confidence score of 95%, whereas a location determined based on triangulation techniques may have a lower confidence score of 75%. Thus, location datasets and corresponding location histories can be used to determine where users have been (and when) with a specified level of confidence. For example, a location history corresponding to mobile device 104a having a device ID of 1234 and being detected at locations A, B and C may include the following location datasets: [1234; A; 1/1/2013 @ 3:30 pm; XYZ App; 90%; iPhone; iOS 6.0; Safari Internet Browser, XYZ App]; [1234; B; 1/1/2013 @ 3:45 pm; XYZ App; 75%; iPhone; iOS 6.0; Safari Internet Browser, XYZ App]; and [1234; C; 1/1/2013 @ 5:45 pm; Mapp App; 80%; iPhone; iOS 6.0; Safari Internet Browser, XYZ App]. As a further example, where mobile device 104b does not share its device ID (or the device ID is otherwise not available in association with the detected location information), a location history corresponding to mobile device 104b having a device ID of 12345 and being detected at locations D, E and F may include the following location datasets: [n/a; D; 12/31/2012 @ 4:30 pm; XYZ App; 50%; n/a; Android; n/a]; [n/a; E; 1/1/2012 @ 5:15 pm; Provider Ping; 95%; n/a; Android; n/a]; and [n/a; F; 1/3/2013 @6:00 pm; Map App; 95%; n/a; Android; n/a]. Such, location datasets and the resulting location histories can be used to determine places users have visited and when.

Although certain exemplary embodiments described herein refer to a limited number of devices and location datasets for the purposes of illustration, location datastore 122 may include location histories including any number of location datasets for any number of mobile devices and associated users. For example, location datastore 122 may include a location history database that includes location histories for hundreds of thousands of mobile devices. Moreover, the location histories for users can include any number of location datasets indicative any number of locations visited by the users. In some instances, location datasets that fall outside of a relevant period (e.g., hours, days, weeks, months, years or the like) may be expunged. For example, where location histories are only maintained for the past six months, location datasets that correspond to locations detected more than six months prior may be deleted from location datastore 122.

In some instances, users are provided an opportunity to opt-in to collection and sharing of their location information. For example, a user may select an option to withhold their location information, to share their location information without disclosing information by which they can be uniquely identified (e.g., a user ID), or to share their location information along with information by which they can be uniquely identified. Thus, user location information can be maintained in a privacy-friendly fashion. In some instances, these options may be specified via user preferences on the mobile device and/or an application-by-application basis. For example, an application may prompt the user to share their location, and the user may specify whether they would like to share their location information.

Mobile devices 104 may be any of a variety of portable electronic devices. Mobile devices 104 may include a portable power source, such as a battery, that enables them to be used without being tethered to a power source. Mobile devices 104 may be capable of communicating with other entities of environment 100 via network 110. Mobile devices 104 may include, for example, a cellular phone, a smart phone, a personal digital assistant (PDA), a tablet computer, a laptop computer, a vehicle in-dash communication/entertainment/navigator unit, and/or the like. In some embodiments, mobile devices 104 include various input/output (I/O) interfaces, such as a graphical user interface (e.g., display screen), an audible output user interface (e.g., speaker), an audible input user interface (e.g., microphone), a keyboard, a pointer/selection device (e.g., mouse, trackball, touchpad, touchscreen, stylus, etc.), and/or the like. In some embodiments, mobile devices 104 include general computing components and/or embedded systems optimized with specific components for performing specific tasks, such as applications 120. Applications 120 may include one or more modules having program instructions that are executable by a computer system to perform some or all of the functionality described herein with regard to mobile devices 104. An application may include, for example, an Internet browser (e.g., Apple's Safari Internet browser), special purpose apps (e.g., the XYZ Store shopping app, a mapping app, a search app, etc.), and/or the like. In some embodiments, mobile devices 104 include computer systems similar to that of computer system 1000 described below with regard to at least FIG. 4.

Although certain embodiments are described with regard to mobile devices, it should be noted, that the present techniques are not limited to mobile devices. Other computing devices subject to geolocation may also generate data useful for forming user profiles and location histories. For instance, set-top boxes, gaming consoles, or Internet-capable televisions may be geolocated based on IP addresses, and data from user interactions with these devices may be used to update user profile and location histories, e.g., with user interaction indicating a time at which a user was at the geolocation corresponding to the device.

Mobile device location information can be provided by mobile devices 104 and/or other entities of environment 100. In some embodiments, mobile devices 104 include location aware devices that are capable of determining their position. For example, a mobile device 104 may include an embedded global-positioning system (GPS) device capable of determining its current location. In some embodiments, the location of mobile devices 104 is determined indirectly. For example, where a mobile device 104 does not include an embedded GPS device, or the location information is otherwise unavailable directly from the mobile device 104, the location of the mobile device 104 can be determined based on attributes of the wireless environment, such as the location of network access points (e.g., wireless hotspots, cellular towers, etc.) used by the mobile device 104 to access network 110 and/or the relative strength of signal between wireless access points that can be used to triangulate the location of the mobile device 104.

The locations of mobile devices 104 may be obtained at various times. In some embodiments, the location of a mobile device 104 is obtained in response to network activity. For example, a location dataset for a mobile device 104 may be generated when it connects to a network (e.g., upon power-up and connection to network 110). In some embodiments, the location of a mobile device 104 is determined at regular intervals. For example, a mobile device 104 may be configured to generate location datasets at regular intervals (e.g., every minute, hours, day, or the like). In some embodiments, the location of a mobile device 104 is determined in response to a query, such as location polling. For example, a mobile device 104 may generate a location dataset in response to a "ping" by its service provider 108. In some embodiments, the location of a mobile device 104 is determined when a user interacts with a particular application. For example, a mobile device 104 may generate a location dataset when a user interacts with (e.g., launches or otherwise uses) an application 120 or webpage that has permission to obtain the location of the mobile device 104. In some instances, the application may periodically acquire current location datasets corresponding to the current location of the mobile device 104 as the user continues to interact with the application 120.

In some embodiments, acquired location information is provided to other entities in real time. For example, upon determining its location, a mobile device 104 (or other entity) may transmit to third parties (such as system 102, third party servers 106, service providers 108, and/or the like), a location dataset corresponding to the current location of the mobile device 104. Such an embodiment may enable third parties to access the real-time locations of mobile devices. In some embodiments, acquired location information (e.g., location datasets) is provided to other entities as location histories. For example, a mobile device 104 (or other entity) may collect a set of location datasets corresponding to locations of the mobile device 104 over a period of time, and periodically transmit the set to third parties (such as system 102, third party servers 106, service providers 108, and/or the like). Such an embodiment may reduce network traffic, and/or allow for collection and storage of location datasets when network access is unavailable (e.g., when a mobile device 104 is located in a rural location where it can collect it location via an integrated GPS device, but is unable to communicate via network 110).

In some embodiments, location information received by system 102 is used to generate location histories stored in location datastore 122. For example, where the location dataset for location A is received in real time from mobile device 104a, and the location datasets for locations B and C are later received from a third party entity (e.g., an app server that obtained location the location datasets from mobile device 104a), the location datasets may be added to an existing location history (e.g., an existing set of location datasets) for mobile device 104a to generate an updated location history for mobile device 104a. In some embodiments, system 102 may update location histories for any number of devices in a similar manner such that location datastore 122 includes a database of updated location histories for any number of devices. Marketing system 102 may be constructed from one or more of the computers described below with reference to at least FIG. 4. These computers may include a tangible, non-transitory, machine-readable medium, such as various forms of memory storing instructions that when executed by one or more processors of these computers (or some other data processing apparatus) cause the computers to provide the functionality of marketing system 102 described herein. Components of marketing system 102 are illustrated as discrete functional blocks, but it should be noted that the hardware and software by which these functional blocks are implemented may be differently organized, for example, code or hardware for providing the functionality may be intermingled, subdivided, conjoined, or otherwise differently arranged.

The illustrated user-profile acquisition module 120a may be configured to generate user-profiles that are stored in user-profile datastore 116. For example, user-profile acquisition module 120a may provide for the collection, generation and/or storage of user profile information as described herein.

The illustrated location-history acquisition module 120b may be configured to collect location histories that are stored in location-history datastore 122. For example, location-history acquisition module 120b may provide for the collection, generation and/or storage of user location datasets and/or user location histories for mobile devices 104 as described herein.

The illustrated place identification module 120c may be configured to identify places and associated place characteristics, such as polygonal boundaries associated with the places, which are stored in a place datastore 124. The illustrated marketing module 120d may be configured to provide information for selecting marketing content to be provided to users (e.g., to ad servers) and/or maintain a record of marketing content that has been served to users in marketing datastore 126. The illustrated marketing module 120d may be configured to provide information for selecting marketing content to be provided to users and/or to maintain a record of marketing content that has been served to users in marketing datastore 126. The illustrated visitation rate module 120e may be configured to determine PVR for places and/or maintain (e.g., create or update) a record of PVRs in PVR datastore 114. The illustrated target group module 120f may be configured to use the determined PVRs (along with other relevant information) to identify target groups of user (i.e., groups of users for which it may be desirable to provide marketing content). The target group information may be stored in marketing datastore 126. Certain operational details of modules 120 (i.e., modules 120a-120f) may be described in more detail below with regard to at least methods 200 and 300.

Figure 2:
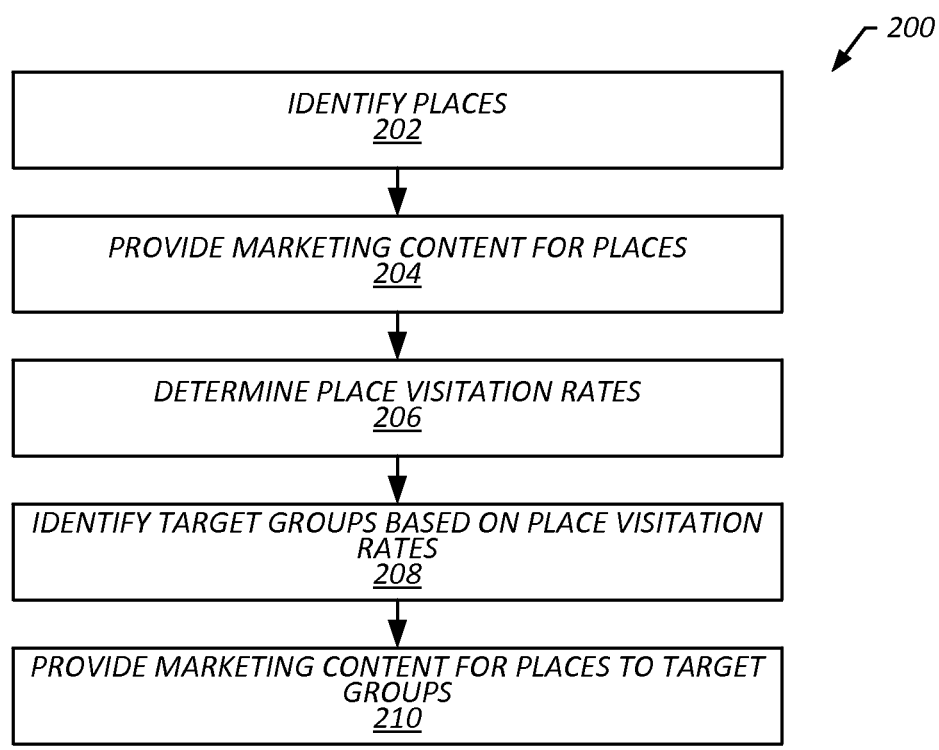
FIG. 2 is a flowchart that illustrates a method for providing marketing content in accordance with one or more embodiments of the present technique.

FIG. 2 is a flowchart that illustrates a method 200 for providing marketing content in accordance with one or more embodiments of the present technique. Method 200 generally includes identifying places, providing marketing content for the places, determining place visitation rates (e.g., based on locations of mobile user devices), identifying target groups based on the place visitation rates, and providing marketing content for the places to the targeted groups.

Method 200 may include identifying places of interest (block 202). This step may be performed by the above described place identification module 120c. In some embodiments, identifying places of interest includes identifying one or more places of interest. For example, where the XYZ store has ten brick-and-mortar retail locations (e.g., XYZ stores #1-10), and has expressed interested in monitoring visitation rates for the ten retail locations, the ten retail stores may be identified as places of interest. In some embodiment, identifying places includes identifying geographic locations ("geolocations") associated therewith. For example, for a geographic location may be identified for each of the ten XYZ stores. A geolocation for a given store may include, for example, geographic coordinates that correspond to the geolocation of the store and/or a polygon defining an area associated with the store. Such a polygon may include a boundary that represents an area associated with the store (e.g., the outline of the store's building, parking lot, and/or the like). Such place information may be stored in place datastore 124 in association with the respective places. Thus, for example, a record for the XYZ store #1 may include a geographic coordinate corresponding to the geolocation of the store (e.g., centroid of the store) and/or a polygon defining an area associated with the interior of the store. Similar records may be provided for any number of places of interest.

In some embodiments, such geolocation information may not be readily available and, thus, may be difficult to obtain. The level of difficulty may increase as the number of places increases. For example, where thousands of places of interest are identified, geographic coordinates and/or polygons may need to be identified for each of the thousands of places of interest. In some embodiments, the geographic coordinates and/or the polygons may be identified using a crowdsourcing environment, such as Amazon's Mechanical Turk crowdsourcing platform. In one such embodiment, a list of the places of interest and/or geographic coordinates corresponding to the respective centroids of the places of interest may be provided from system 102 to a crowdsourcing environment. The crowdsourcing environment may outsource the tasks to a distributed group of people that identify place information, including, for example, geographic coordinates and/or polygons corresponding to the places of interest. The place information may be returned to system 102, and system 102 may use the place information provided via the crowd source environment to updated records for the places of interest in place datastore 124.

Method 200 may include providing marketing content for places of interest (block 204). This step may be performed by the above described marketing module 120d and/or 3$^{rd}$ party servers 106. In some embodiments, providing marketing content for places of interest includes providing advertisements, promotions (e.g., coupons), or similar marketing content to one or more mobile devices. For example, an advertisement server (e.g., a server 106) may serve an advertisement for the XYZ store to mobile device 104a for display to user 118a. In some embodiments, providing marketing content for places of interest includes providing targeted advertising to select users or groups of users. Such users or groups of users may be identified based on user profiles, location histories, and/or PVRs as described in more detail below with regard to block 208. For example, where marketing datastore 126 includes a record of groups of persons (or types of persons) that are likely to be interested in products offered by the XYZ store, marketing system 102 may forward, to the advertisement server (e.g., a server 106), a target group that identifies one or more users (or types of users) that are likely to be interested in products offered by the XYZ store. The advertisement server may, in turn, serve advertisements for the XYZ store to mobile devices 104 associated with the users 118 that are likely to be interested in products offered by the XYZ store. Such targeting of groups may enhance the effectiveness of marketing campaigns by delivering marketing content to those person that are expected to be interested and/or responsive to the marketing content, while reducing the burden and cost associated with serving marking content to those person that are not expected to be interested and/or responsive to the marketing content.

Method 200 may include determining place visitation rates (block 206). This step may be performed by the above described visitation rate module 120e. In some embodiments, place visitation rates are determined based on location histories, user profiles and/or the like. For example, where a location history indicates that a mobile device was located in a place of interest, a visitation rate for the place can be adjusted to account for the person associated with the device having visited the store. In some embodiments, an estimation of a number of other users that may have visited the store can be determined based on a location history indicating that a mobile device was located in a place of interest. For example, where a population profile indicates that one in every ten persons employs a mobile device that can be detected while in the XYZ store (e.g., a ratio of ten visitors per device detected), and locations histories indicate that fifty different mobile devices were in a polygon associated with the XYZ store (e.g., determined above at block 202) on Monday, the Monday visitation rate for the XYZ store may be determined to be approximately five hundred persons (e.g., 50 devices*(10 visitors/1 device detected) =500 visitors).

In some embodiments, the determination of a visitation rate may be aided by user profile information. Such user profile information may be available, for example, where a device ID is obtained for a mobile device, and the device ID is associated with a user profile of datastore 116. For example, where a group profile indicates that one in every two males employs a mobile device that can be detected while in the XYZ store (e.g., a ratio of five male visitors per device detected that is associated with a male person), and locations histories indicate that fifty different mobile devices associated with male users were in a polygon associated with the XYZ store (e.g., determined above at block 202) on Monday, a visitation rate for the XYZ store on Monday may include approximately one hundred male persons (e.g., 50 devices*(2 male visitors/1 device detected)=100 male visitors).

Figure 3:
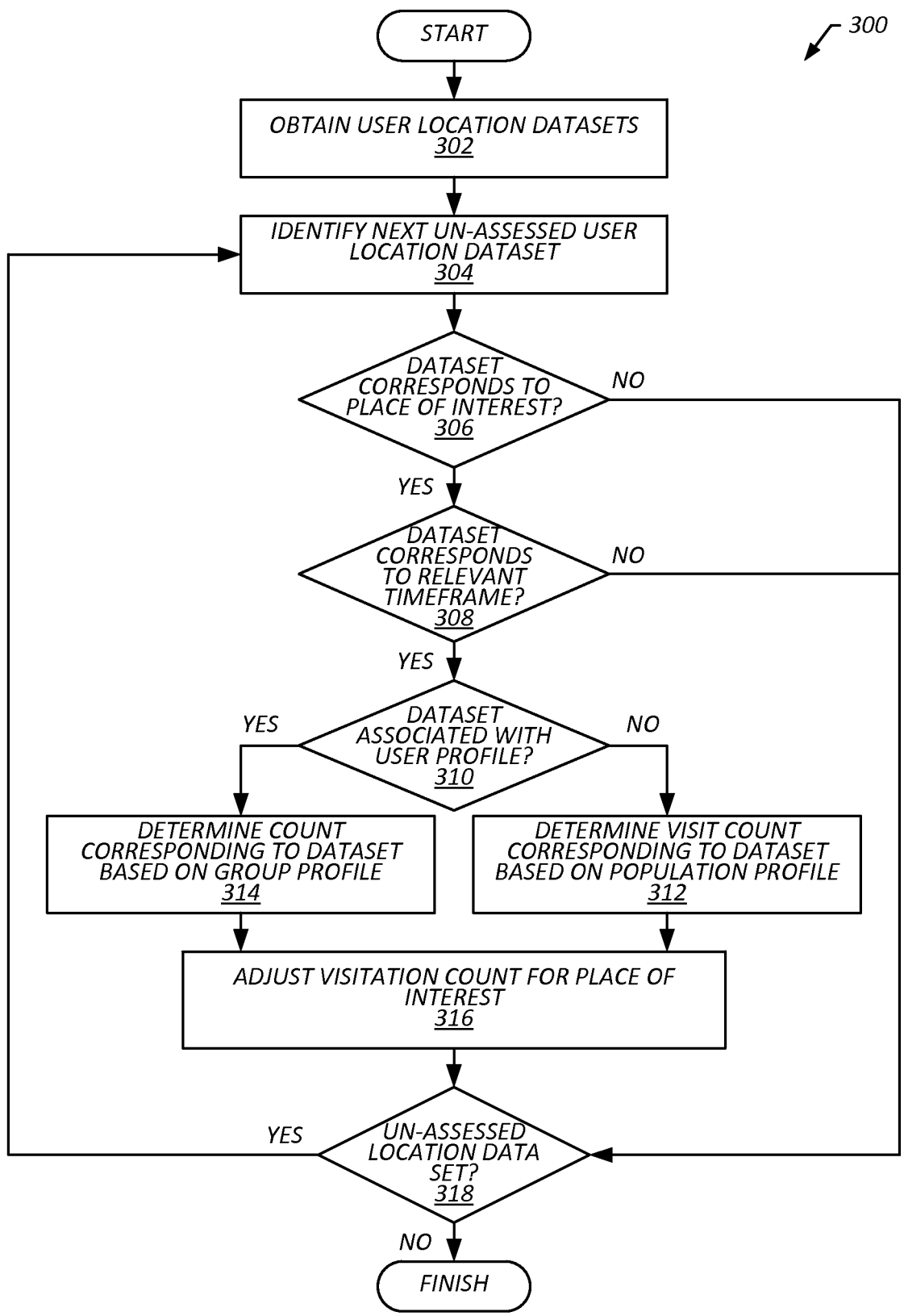
FIG. 3 is a flowchart that illustrates a method for determining visitation rates in accordance with one or more embodiments of the present technique.

FIG. 3 is a flowchart that illustrates a method 300 for determining place visitation rates in accordance with one or more embodiments of the present technique. Method 300 may be an example of determining place visitation rates (block 206) and may be performed by the above described visitation rate module 120e. Method 300 may generally include assessing location datasets to identify mobile devices that have been located in a place of interest, determining whether or not the identified location datasets and/or mobile devices are associated with an available user profile. If so, adjusting a visitation rate/count based on information available in the user profile (and a corresponding group profile), and, if not, adjusting a visitation rate/count based on a population profile.

Method 300 may include obtaining location datasets (block 302). In some embodiments, obtaining location datasets may include retrieving location datasets that have not yet been assessed with regard to determining a visitation rate. For example, where location histories stored in datastore 122 include one million location datasets, and all but ten-thousand have been assessed with regard to determining a visitation rate, obtaining location datasets may include retrieving the ten-thousand un-assessed location datasets. In some embodiments, obtaining location datasets includes obtaining the most recent datasets that have not yet been assessed. In an exemplary embodiment, the obtained location datasets may include the location datasets for locations A-F discussed above (i.e., [1234; A; 1/1/2013 @ 3:30 pm; XYZ App; 90%; iPhone; iOS 6.0; Safari Internet Browser, XYZ App]; [1234; B; 1/1/2013 @ 3:45 pm; XYZ App; 75%; iPhone; iOS 6.0; Safari Internet Browser, XYZ App]; and [1234; C; 1/1/2013 @ 5:45 pm; Mapp App; 80%; iPhone; iOS 6.0; Safari Internet Browser, XYZ App], [n/a; D; 12/31/2012 @ 4:30 pm; XYZ App; 50%; n/a; Android; n/a]; [n/a; E; 1/1/2012 @ 5:15 pm; PING; 95%; n/a; Android; n/a]; and [n/a; F; 1/3/2013 @ 6:00 pm; Map App; 95%; n/a; Android; n/a]).

Method 300 may include identifying a next un-assessed location dataset (block 304). In a first iteration of the process, any one of the location datasets maybe identified as being un-assessed, whereas in a subsequent iterations any one of the other location datasets besides those already assessed can be identified as being un-assessed. For example, in a first iteration, the location dataset for location A may be identified as the next un-assessed location dataset, in a second iteration the second location dataset for location B may be identified as the next un-assessed location dataset, and so forth.

Method 300 may include determining whether the location dataset corresponds to a place of interest (block 306). In some embodiments, determining whether the location dataset corresponds to a place of interest includes determining whether a geolocation of the location dataset corresponds to one or more locations identified in place datastore. For example, where the places of interest include the XYZ stores #1-10, each having a polygon defining an area associated with the respective store, each of the locations B, D and E falls with the boundary of XYZ store #1, it may be determined that the datasets for locations B, D and E correspond to a place of interest. Where none of the locations A, C, or E fall within a boundary of any of the XYZ stores or other places of interest, it may be determined that datasets for locations A, C, and E do not correspond to a place of interest.

Method 300 may include determining whether the location dataset corresponds to a relevant time frame (block 308). In some embodiments, determining whether the location dataset corresponds to a relevant time frame includes determining whether a timestamp associated with the location dataset corresponds to a time period of interest. For example, where the XYZ store is only interested in visitation rates for the first week of 2013, the relevant timeframe may be the first seven days of 2013. Thus, it may be determined that the datasets corresponding to locations B and E correspond to a relevant timeframe based on their time stamps corresponding to Jan. 1, 2013. It may be determined that the dataset corresponding to location D does not correspond to a relevant timeframe based on its time stamp of Dec. 31, 2012.

Method 300 may include determining whether the location dataset is associated with a user profile (block 310). In some embodiments, determining whether the location dataset is associated with a user profile includes determining whether the location dataset includes a device ID, and, if so whether or not the device ID is associated with a user profile. If a location dataset does include a device ID that is associated with a user profile, it may be determined that the location dataset is associated with a user profile. If a location dataset does not include a device ID, or the device ID is not associated with a user profile, it may be determined that the location dataset is not associated with a user profile. For example, where the device ID "1234" is associated with a user profile for Mike Smith, it may be determined that the location dataset corresponding to location B is associated with a user profile. As a further example, it may be determined that the location dataset corresponding to location D is not associated with a user profile as it does not include a device ID.

For location datasets that are not associated with a device ID and/or a user profile, method 300 may proceed to determining a visitation count corresponding to the location dataset based on a population profile (block 312). A population profile may include a profile that is based on a large number of users, and may not take into account various personal characteristics that are available in a user profile. A population profile may be based on characteristics of mobile devices that are provided in location datasets (such as date, time, source, confidence, device type, operating system) but may not be based on characteristics provided in user profiles. For example, a population profile may specify that that one in every ten persons employs a mobile device that can be detected while in stores (e.g., a ratio of ten visitors per device detected in an XYZ store). That is, a population may be a ratio based on the number of total users, and may not take into account variations based on personal characteristics such as preferences, interests, hobbies, demographics information (e.g., gender, age, etc.) and so forth. As a further example, a population profile may specify that one in every fifty users in the XYZ store uses the XYZ app while in an XYZ store (e.g., a ratio of fifty visitors per device detected using the XYZ app in an XYZ store). Thus for example, based on the location dataset associated with location D indicating the use of the "XYZ App" while in the XYZ store #1, a visit count of fifty can be associated with the location dataset (e.g., 1 device using app*(50 visitors/1 device detected using app)=50 visitors).

For location dataset that are associated with a device ID and/or a user profile, method 300 may proceed to determining a visitation count corresponding to the location dataset based on a group profile (block 314). A group profile may include a profile that takes into account various characteristics of persons that are available in users' profiles. For example, a group profile may specify that one in every five males employs a mobile device that can be detected while in the XYZ store (e.g., a ratio of five male visitors per device detected that is associated with a male person), Thus for example, based on the location dataset associated with location B having a device ID associated with Mike Smith's profile, and Mike Smith's user profile indicating that is male in gender, a visit count of five can be associated with the location dataset (e.g., 1 device*(5 visitors/1 device associated with a male)=5 visitors). Although a single group profile has been provided for the purpose of illustrations, any number of group profiles can be used based on any number of relevant user profile characteristics such as preferences, interests, hobbies, demographics information (e.g., gender, age, etc.) and so forth.

Method 300 may include adjusting a visitation count for the place of interest (block 316). In some embodiments, adjusting a visitation count for the place of interest includes adjusting a visitation count for the place of interest during the relevant timeframe to include a visitation count associated with the location dataset. For example, in an iteration that includes assessing the location dataset associated with location B for which a visitation count of five visitors is determined (e.g., see block 314), a count for the first week of January 2013 may be increased by five (e.g., from one-hundred to one-hundred five). As a further example, in a subsequent iteration that includes assessing the location dataset associated with location D for which a visitation count of fifty visitors is determined (e.g., see block 312), a count for the first week of January 2013 may be increased by fifty (e.g., from one-hundred five to one-hundred fifty-five). Method 300 may continue to assess any un-assessed location dataset (block 318). Upon assessing the location profiles, a total visitation count can be determined for the relevant period. For example, it may be determined that 10,000 persons visited the XYZ store #1 during the first week of January. A PVR of 10,000 may be generated for XYZ store #1 for the first week in January. The PVR may be stored in PVR datastore 114. Thus, in some embodiments, determining a PVR includes determining a number of persons that visit a place in a given time frame. Such information may be provide to a party of interest, such as an owner of the XYZ store, to provide an indication of how many people visit the XYZ stores and when. For example, a store owner can predict fluctuations in persons that visit their store on a given day of the week based on PVRs for each of the respective days of the week. Such information may be particularly helpful in managing the day to day operations of the business, such as adjusting staffing of employees to account for the expected number of visitors on the given days, determining the effectiveness of changes in business strategy, including, for example, advertising campaigns, physical changes in a stores layout and so forth.

Although embodiments have been described in the context of a limited number of location datasets, using exemplary population/group profiles, and exemplary timeframes, embodiments may be employed for any number of location datasets, any variety of population/group profiles, and any relevant timeframes (e.g., hours, days, weeks, years, and so forth).

Referring again to FIG. 2, in some embodiments, determining place visitation rates (block 206) includes determining rates at which users respond to various marketing campaigns. For example, determining a place visitation rate may include determining a rate (e.g., a percentage or ratio) at which users visit a place after receiving an advertisement or other marketing content for the place. In some embodiments, determining place visitation rates (block 206) includes determining rates at which users in certain locations respond to various marketing campaigns. For example, determining a place visitation rate may include determining a rate at which users visit a place after receiving an advertisement or other marketing content for the place while being located in a given region.

In some embodiments, location histories and user profiles can be used to determine how certain groups of users respond to marketing campaigns. For example, when a location dataset indicates that a user has visited an XYZ store, and the user's profile indicates that the he/she had recently been served an advertisement for the XYZ store, it may be determined that the advertisement was effective in driving the user to visit the store. In some embodiments, the effectiveness may be determined based on a PVR for user's that have been served ads. For example, where an advertisement campaign includes sending an advertisement to one-thousand mobile devices 104, and it is determined that one-hundred of those mobile devices 104 were detected in the XYZ store (e.g., based on location histories and/or user profiles), the advertisement may have a PVR of 1/10 (or 10%)—indicative of the fact that one-in-ten of the user's served the advertisement visited the XYZ store.

In some embodiments, the effectiveness may be determined based on a PVR for user's that have been served ads in a given region. For example, where an advertisement campaign includes sending an advertisement for the XYZ store to one-hundred mobile devices 104, and the location histories and user profiles associated with those devices reveal that ten of those users were served the advertisement while being located in a first region, forty of those users were served with the advertisement while being located in a second region, and fifty of those users were served the advertisement while being located in a third region, it can be determined that the advertisement for the XYZ store has a PVR of 1/100 (1%) for the first region, a PVR of 4/100 (4%) for the second region, and a PVR of 5/100 (5%) for the second region—each of the PVRs being indicative of the percentage of user that receive the advertisement while in the respective region and subsequently visited the XYZ store.

In some embodiments, regions may include a radial distance. For example, the first region may include locations within a one kilometer (km) of the XYZ store, the second region may include locations within one to five kilometers of the XYZ store, and the third region may include locations greater than five kilometers from the XYZ store. In some embodiments, regions may include a geographic tile (or cell). A geographic tile (or cell) may include a square area that is a segment of a larger area. For example, an area that is 100 km×100 km may be divided in a grid of one-hundred thousand non-overlapping 1 km×1 km tiles/cells. Thus, for example, the first region may include a first tile, the second region may include a second tile, and the third region may include a third tile.

Method 200 may include identifying target groups based on place visitation rates (block 208). This step may be performed by the above described target group module 120f. In some embodiments, target groups are identified based on common characteristics of users that visit a place. For example, where a majority of the persons that are determined to visit the XYZ store are have user profiles indicating that they are age "20-45", users of the age "20-45" may be identified as a target group for the XYZ store. In some embodiments, the target user groups may be identified based on "look-a-like" modeling (i.e., the target group having characteristics that are the same or similar to those of persons that are doing something you want them to do, such as visiting the XYZ store).

In some embodiments, users in a given region are identified as a target group based on the region having a relatively high PVR for the XYZ store. For example, in the above embodiments, if a threshold PVR is set at 2%, users in the second and third regions may be identified as target groups for the advertisement for the XYZ store based at least in part the PVRs for the regions being above the threshold PVR.

In some embodiments, users in a given region are identified as a target group based on the region sharing characteristics with a region having a relatively high PVR. For example, where a characteristic of the second region includes "shopping locations", "incomes above $50,000", and ages "20-45", the target group may include users in other regions having characteristics that are the same or similar to those of the second region (e.g., regions having characteristics of "shopping locations", "incomes above $50,000", and ages "20-45"). Thus, for example, users in a plurality of different cells may be identified as target groups based on the respective cells sharing characteristics with one or more regions having relatively high PVRs.

Method 200 may include providing marketing content for places to target groups (block 210). This step may be performed by the above described marketing module 120d. In some embodiments, providing marketing content for places to target groups includes providing advertisements or similar marketing content to users in an associated target group. For example, where users of the age "20-45" is identified as a target group for the XYZ store and user 118a has a user profile that indicates he/she is twenty-five years of age, a target group that includes user 118a may be provided to an ad server (e.g., server 106), and the ad server may serve an ad for the XYZ store to mobile device 104a for presentation to user 118a based at least in part on user 118a being part of the identified target group. As a further example, where users in certain regions (e.g., second and third tiles) are identified as a target group for the advertisement for the XYZ store and mobile device 104a is located in one of the identified regions, the ad server may serve an ad for the XYZ store to mobile device 104a for presentation to user 118a based at least in part on mobile device 104a and/or user 118a being located in one of the identified regions.

Thus, in some embodiments, user location histories and user profiles can be used to assist in determining and fine-tuning PVRs. These PVRs can be used by interested parties, such as business owners, to determine when people visit places of interest. Moreover, in some embodiments, the determined PVRs can be used to identify target groups to whom targeted marketing content can be provided.

It will be appreciated that methods 200 and 300 are exemplary embodiments of methods that may be employed in accordance with the techniques described herein. Methods 200 and 300 may be modified to facilitate variations of its implementations and uses. Methods 200 and 300 may be implemented in software, hardware, or a combination thereof. Some or all of methods 200 and 300 may be implemented by one or more of the modules/applications described herein. The order of the steps of methods 200 and 300 may be changed, and various elements may be added, reordered, combined, omitted, modified, etc.

Figure 4:
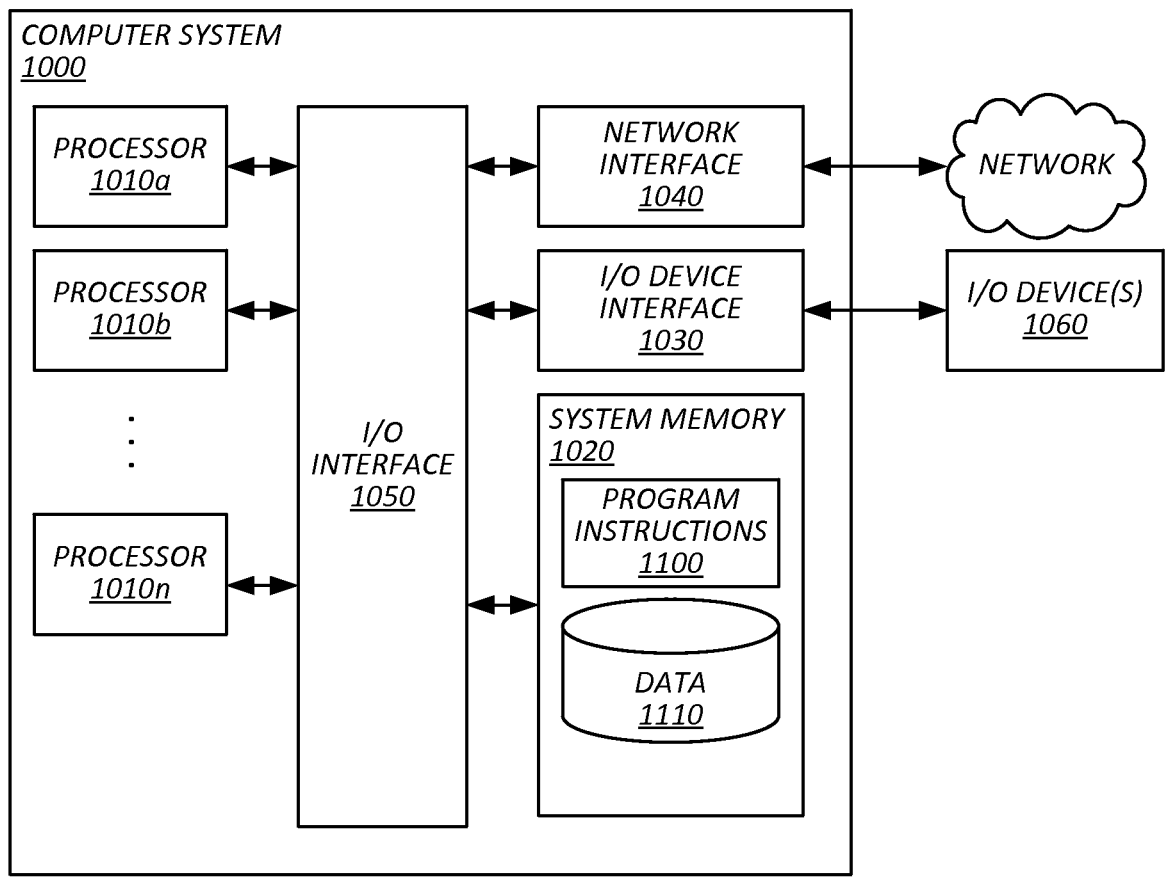
FIG. 4 is a block diagram that illustrates an exemplary computer system in accordance with one or more embodiments of the present technique.

FIG. 4 is a block diagram that illustrates an exemplary computer system in accordance with one or more embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030 and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area (WAN), a cellular communications network or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include, non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). In some embodiments, the program may be conveyed by a propagated signal, such as a carrier wave or digital signal conveying a stream of packets.

I/O interface 1050 may be configured to coordinate I/O traffic between processors 1010a-1010n, system memory 1020, network interface 1040, I/O devices 1060 and/or other peripheral devices. I/O interface 1050 may perform protocol, timing or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000, or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending or storing instructions or data implemented in accordance with the foregoing description upon a computer-accessible medium. Accordingly, the present invention may be practiced with other computer system configurations.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a", "an" and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Further, unless otherwise indicated, statements that one value or action is "based on" another condition or value encompass both instances in which the condition or value is the sole factor and instances in which the condition or value is one factor among a plurality of factors. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing or computing device is capable of manipulating or transforming signals, for instance signals represented as physical electronic, optical, or magnetic quantities within memories, registers, or other information storage devices, transmission devices, or display devices of the special purpose computer or similar special purpose processing or computing device.

What is claimed is:

1. A computer implemented method utilizing a global positioning system and cellular towers to indicate locations of mobile devices that use the indicated locations to provide location histories for estimating visitation rates at a brick-and-mortar store, the computer implemented method comprising:

receiving, with the mobile devices, from the global positioning system and from the cellular towers, signals indicative of the locations of the mobile devices;

forming, based on the indicated locations, the location histories of the mobile devices, the location histories including: a specific date and time, a type of each of the mobile devices, a specific operating system employed by each of the mobile devices, and an identifier of a specific mobile application of the brick-and-mortar store employed by each of the mobile devices;

assigning a higher confidence score to each of at least some of the locations based on signals from the global positioning system;

assigning a lower confidence score to each of at least some other of the locations based on signals from the cellular towers;

identifying a boundary for the brick-and-mortar store by defining a polygonal boundary area associated with the brick-and-mortar store;

determining, based on the formed location histories, a number of the mobile devices in the polygonal boundary area associated with the brick-and-mortar store during a day of a week corresponding to an advertisement of the brick-and-mortar store in an advertising region of the brick-and-mortar store;

obtaining, from a population profile, a ratio of undetected and detected visitors of a specific gender, a specific age, using the specific mobile device type, the specific operating system, and the specific mobile application of the brick-and-mortar store; and estimating, by one or more processors, the visitation rates for the brick-and-mortar store, by mathematically multiplying the number of the mobile devices from the location histories by the ratio; and storing the estimated visitation rates in a memory.

2. The method of claim 1, further comprising:

identifying a location history of a given one of the mobile devices by indicating a plurality of time-stamped geographic locations sensed by the given mobile device associated with a given user;

wherein each of the respective ones of the plurality of time-stamped geographic locations indicates a location of the mobile device and a given date and time associated with the location of the mobile device.

3. The method of claim 2, further comprising:

identifying for the given mobile device having the location history:

a given type of the given mobile device, a given operating system of the given mobile device, and the identifier of the specific mobile application of the brick-and-mortar store employed by the given mobile device.

4. The method of claim 1, wherein identifying a boundary comprises:

identifying a plurality of centroids corresponding to a plurality of different places, the plurality of different places including the brick-and-mortar store;

identifying boundary polygons for the plurality of different places based at least in part on the plurality of centroids; and storing, in the memory, for each of the plurality of different places, a corresponding polygonal boundary that bounds a respective geographic area.

5. The method of claim 1, wherein determining, based on the formed location histories, a number of the mobile devices in the polygonal boundary area associated with the brick-and-mortar store comprises:

determining whether a location history of a given one of the mobile devices determined to be in the polygonal boundary area is associated with a location characteristic; and in response to determining that the location history of the given mobile device is associated with the location characteristic, identifying a user profile based on the location characteristic, wherein the user profile is indicative of a specific gender of a user, a specific age of the user, a type of mobile device of the user, an operating system of the mobile device of the user, and the specific mobile application of the brick-and-mortar store employed by the mobile device of the user.

6. The method of claim 5, wherein the user profile is a personal profile that is unique to the user, and the population profile is associated with demographics of a plurality of different persons including users of the specific mobile application, or both the users and non-users of the specific mobile application.

7. The method of claim 5, wherein estimating the visitation rates for the brick-and-mortar store comprises:

determining a visitation count for the brick-and-mortar store during the day of the week; and adjusting the visitation count to include a current visit count corresponding to the brick-and-mortar store determined based on other locations histories or other timeframes.

8. The method of claim 1, further comprising:

indicating, with the location histories, a type of a given mobile device among other types of mobile devices;

indicating, with the location histories, a specific operating system or version thereof employed by the given mobile device among other operating systems or versions thereof;

identifying, with the location histories, the specific mobile application of the brick and mortar stored employed by the given mobile device; and assigning, amongst the locations of the given mobile device, at least one of the higher confidence scores and at least one of the lower confidence scores by determining respective confidence scores for the respective ones of the locations.

9. The method of claim 1, wherein:

the ratio of undetected and detected visitors is based on numbers of mobile devices of users reporting respective location histories relative to other users or persons for which their respective mobile devices are not reporting locations histories to estimate numbers of persons having visited the brick-and-mortar store based on numbers of mobile devices detected in the polygonal boundary area associated with the brick-and-mortar store.

10. The method of claim 1, wherein an indicated location is a time-stamped geographic location indicative of a physical location of a mobile device, as determined by the mobile device based on one or more signals indicative of respective locations, at a specific time identified by a time-stamp.

11. The method of claim 10, wherein the time-stamped geographic location is associated with a specific date indicative of a given day of a given calendar year.

12. The method of claim 10, wherein the geographic location comprises a geographic area.

13. The method of claim 1, further comprising:
transmitting one or more content items corresponding to the advertisement of the brick-and-mortar store to a given mobile device associated with the advertising region for presentation to a user of the given mobile device;
identifying a received location of the given mobile device at a specific time or over a period of time when at least one of the content items is displayed by the mobile device; and
determining a visitation effectiveness for a geographic area within the advertising region based at least in part on the received location.

14. The method of claim 13, wherein the visitation effectiveness is based at least in part on identification of the given mobile device of the user within the number of the mobile devices in the polygonal boundary area associated with the brick-and-mortar store after the display of at least one of the content items by the given mobile device.

15. The method of claim 13 further comprising:
transmitting at least one of the content items to other mobile devices of other users in the geographic area or advertising region based at least in part on identification of the given mobile device of the user within the number of the mobile devices in the polygonal boundary area associated with the brick-and-mortar store.

16. The method of claim 13, wherein the geographic area is associated with a given radius from the brick-and-mortar store that includes the received location.

17. The method of claim 13, wherein the geographic area comprises a geographic tile including the received location or is a geographic tile including the received location.

18. The method of claim 17, further comprising:
identifying a demographic for the tile;
identifying a different geographic area having a same or similar demographic as the tile; and
transmitting at least one of the content items to other mobile devices of other users within the different geographic area based at least in part on identification of the given mobile device of the user within the number of the mobile devices in the polygonal boundary area associated with the brick-and-mortar store.

19. A non-transitory computer-readable medium storing computer program instructions for processing indicated locations of mobile devices configured to utilize a global positioning system and cellular towers to provide location histories for estimating visitation rates at a brick-and-mortar store, the computer program instructions, when executed by one or more processors, effectuating operations comprising:
receiving, with the mobile devices, from the global positioning system and from the cellular towers, signals indicative of the locations of the mobile devices;
forming, based on the indicated locations, the location histories of the mobile devices, the location histories including: a specific date and time, a type of each of the mobile devices, a specific operating system employed by each of the mobile devices, and an identifier of a specific mobile application of the brick-and-mortar store employed by each of the mobile devices;
assigning a higher confidence score to each of at least some of the locations based on signals from the global positioning system;
assigning a lower confidence score to each of at least some other of the locations based on signals from the cellular towers;
identifying a boundary for the brick-and-mortar store by defining a polygonal boundary area associated with the brick-and-mortar store;
determining, based on the formed location histories, a number of the mobile devices in the polygonal boundary area associated with the brick-and-mortar store during a day of a week corresponding to an advertisement of the brick-and-mortar store in an advertising region of the brick-and-mortar store;
obtaining, from a population profile, a ratio of undetected and detected visitors of a specific gender, a specific age, using the specific mobile device type, the specific operating system, and the specific mobile application of the brick-and-mortar store; and
estimating the visitation rates for the brick-and-mortar store, by mathematically multiplying the number of the mobile devices from the location histories by the ratio; and
storing the estimated visitation rates in a memory.

20. The non-transitory computer-readable medium of claim 19, wherein the computer program instructions, when executed by the one or more processors, further effectuate operations comprising:
identifying a location history of a given one of the mobile devices by indicating a plurality of time-stamped geographic locations sensed by the given mobile device associated with a given user;
wherein each of the respective ones of the plurality of time-stamped geographic locations indicates a location of the mobile device and a given date and time associated with the location of the mobile device.

21. The non-transitory computer-readable medium of claim 20, wherein the computer program instructions, when executed the by one or more processors, further effectuate operations comprising:
identifying for the given mobile device having the location history:
a given type of the given mobile device,
a given operating system of the given mobile device, and
the identifier of the specific mobile application of the brick-and-mortar store employed by the given mobile device.

22. The non-transitory computer-readable medium of claim 19, wherein identifying a boundary comprises:
identifying a plurality of centroids corresponding to a plurality of different places, the plurality of different places including the brick-and-mortar store;
identifying boundary polygons for the plurality of different places based at least in part on the plurality of centroids; and
storing, in the memory, for each of the plurality of different places, a corresponding polygonal boundary that bounds a respective geographic area.

23. The non-transitory computer-readable medium of claim 19, wherein determining, based on the formed location histories, a number of the mobile devices in the polygonal boundary area associated with the brick-and-mortar store comprises:

determining whether a location history of a given one of the mobile devices determined to be in the polygonal boundary area is associated with a location characteristic; and in response to determining that the location history of the given mobile device is associated with the location characteristic, identifying a user profile based on the location characteristic, wherein the user profile is indicative of a specific gender of a user, a specific age of the user, a type of mobile device of the user, an operating system of the mobile device of the user, and the specific mobile application of the brick-and-mortar store employed by the mobile device of the user.

24. The non-transitory computer-readable medium of claim 23, wherein the user profile is a personal profile that is unique to the user, and the population profile is associated with demographics of a plurality of different persons including users of the specific mobile application, or both the users and non-users of the specific mobile application.

25. The non-transitory computer-readable medium of claim 19, wherein:

the ratio of undetected and detected visitors is based on numbers of mobile devices of users reporting respective location histories relative to other users or persons for which their respective mobile devices are not reporting locations histories to estimate numbers of persons having visited the brick-and-mortar store based on numbers of mobile devices detected in the polygonal boundary area associated with the brick-and-mortar store.

26. The non-transitory computer-readable medium of claim 19, wherein:

an indicated location is a time-stamped geographic location indicative of a physical location of a mobile device, as determined by the mobile device based on one or more signals indicative of respective locations, at a specific time identified by a time-stamp, and wherein, the time-stamped geographic location is associated with a specific date indicative of a given day of a given calendar year.

27. The non-transitory computer-readable medium of claim 26, wherein the geographic location comprises a geographic area.

28. The non-transitory computer-readable medium of claim 19, wherein the computer program instructions, when executed the by one or more processors, further effectuate operations comprising:

indicating, with the location histories, a type of a given mobile device among other types of mobile devices;

indicating, with the location histories, a specific operating system or version thereof employed by the given mobile device among other operating systems or versions thereof;

identifying, with the location histories, the specific mobile application of the brick and mortar stored employed by the given mobile device; and assigning, amongst the locations of the given mobile device, at least one of the higher confidence scores and at least one of the lower confidence scores by determining respective confidence scores for the respective ones of the locations.

* * * * *